(12) United States Patent
Enomoto

(10) Patent No.: US 11,936,054 B2
(45) Date of Patent: *Mar. 19, 2024

(54) ENERGY STORAGE DEVICE

(71) Applicant: GS Yuasa International Ltd., Kyoto (JP)

(72) Inventor: Yukio Enomoto, Daito (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/724,273

(22) Filed: Apr. 19, 2022

(65) Prior Publication Data

US 2022/0238946 A1 Jul. 28, 2022

Related U.S. Application Data

(63) Continuation of application No. 16/633,531, filed as application No. PCT/EP2018/070017 on Jul. 24, 2018, now Pat. No. 11,329,337.

(30) Foreign Application Priority Data

Jul. 31, 2017 (JP) .................................. 2017-148357

(51) Int. Cl.
*H01M 50/147* (2021.01)
*H01M 50/15* (2021.01)
(Continued)

(52) U.S. Cl.
CPC ......... *H01M 50/147* (2021.01); *H01M 50/15* (2021.01); *H01M 50/531* (2021.01);
(Continued)

(58) Field of Classification Search
CPC .. H01M 50/20; H01M 50/172; H01M 50/543; H01M 50/331
See application file for complete search history.

(56) References Cited

U.S. PATENT DOCUMENTS 8,906,545 B2 12/2014 Hattori et al.
9,225,001 B2 12/2015 Hattori et al.
(Continued)

FOREIGN PATENT DOCUMENTS

CN 105144432 A 12/2015
EP 2 445 033 A1 4/2012
(Continued)

OTHER PUBLICATIONS

Office Action in U.S. Appl. No. 16/633,531 dated Sep. 1, 2021.
(Continued)

*Primary Examiner* — Kenneth J Douyette
(74) *Attorney, Agent, or Firm* — McGinn I.P. Law Group, PLLC

(57) ABSTRACT

An energy storage device includes an outer case including a lid plate on which an external terminal is mounted, a plate including a tab and housed in the outer case, a conductive shaft portion penetrating the lid plate and including one end thereof connected to the external terminal, and a conductive plate portion housed in the outer case, and including a first surface to which an other end of the conductive shaft portion is connected and a second surface to which the tab is connected. A size of the conductive plate portion is set larger than a size of the external terminal in a planar direction of the lid plate.

21 Claims, 5 Drawing Sheets

(51) Int. Cl.
  *H01M 50/531* (2021.01)
  *H01M 50/533* (2021.01)
  *H01M 50/55* (2021.01)
  *H01M 50/176* (2021.01)
  *H01M 50/505* (2021.01)
  *H01M 50/51* (2021.01)
  *H01M 50/516* (2021.01)
  *H01M 50/536* (2021.01)
  *H01M 50/553* (2021.01)
  *H01M 50/566* (2021.01)

(52) U.S. Cl.
  CPC ........ *H01M 50/533* (2021.01); *H01M 50/176* (2021.01); *H01M 50/505* (2021.01); *H01M 50/51* (2021.01); *H01M 50/516* (2021.01); *H01M 50/536* (2021.01); *H01M 50/55* (2021.01); *H01M 50/553* (2021.01); *H01M 50/566* (2021.01); *H01M 2220/20* (2013.01)

(56) References Cited

U.S. PATENT DOCUMENTS

| | | |
|---|---|---|
| 9,653,722 B2 | 5/2017 | Yamada et al. |
| 10,276,888 B2 | 4/2019 | DeWulf et al. |
| 11,329,337 B2 | 5/2022 | Enomoto |
| 2002/0009634 A1 | 1/2002 | Oogaku |
| 2006/0019150 A1 | 1/2006 | Rigobert et al. |
| 2008/0057394 A1 | 3/2008 | Rigobert et al. |
| 2012/0100419 A1 | 4/2012 | Byun et al. |
| 2016/0043353 A1 | 2/2016 | Tsutsumi et al. |
| 2017/0117575 A1* | 4/2017 | DeWulf ................ B23K 26/24 |

FOREIGN PATENT DOCUMENTS

| | | |
|---|---|---|
| JP | H11-191404 A | 7/1999 |
| JP | H11-283588 A | 10/1999 |
| JP | 2001-291506 A | 10/2001 |
| JP | 2002-324541 A | 11/2002 |
| JP | 2009-277603 A | 11/2009 |
| JP | 2013-157130 A | 8/2013 |
| JP | 2013-182724 A | 9/2013 |
| JP | 2014-165155 A | 9/2014 |
| JP | 2015-144093 A | 8/2015 |
| JP | 2016-001561 A | 1/2016 |
| JP | 2016-091659 A | 5/2016 |
| JP | 2016-091720 A | 5/2016 |
| JP | 2017-510959 A | 4/2017 |
| JP | 2021-180183 A | 11/2021 |

OTHER PUBLICATIONS

Notice of Allowance in U.S. Appl. No. 16/633,531 dated Jan. 12, 2022.

International Search Report (ISR) (PCT Form PCT/ISA/210), in PCT/EP2018/070017, dated Oct. 18, 2018.

* cited by examiner

ENERGY STORAGE DEVICE

CROSS REFERENCE TO RELATED APPLICATIONS

The present application is a Continuation application of U.S. patent application Ser. No. 16/633,531, now U.S. Pat. No. 11,329,337 filed on Jan. 23, 2020, which is a U.S. National Stage entry of International Patent Application PCT/EP2018/070017 filed on Jul. 24, 2018, which is based on Japanese Patent Application No. 2017-148357 filed on Jul. 31, 2017, the entire contents of which is incorporated herein by reference.

TECHNICAL FIELD

The present invention relates to an energy storage device.

BACKGROUND ART

A chargeable and dischargeable energy storage device is used in various equipment such as a mobile phone and an automobile. A vehicle which uses electric energy as a power source such as an electric vehicle (EV) or a plug-in hybrid electric vehicle (PHEV) requires a large energy. Accordingly, a large-capacity energy storage module which includes a plurality of energy storage devices is mounted on such a vehicle.

The energy storage device includes an outer case, and an electrode assembly housed in the outer case and having a plurality of positive electrode plates and a plurality of negative electrode plates stacked by way of separators. Tabs are formed on the positive electrode plates and the negative electrode plates respectively. Two external terminals corresponding to the positive electrode plates and the negative electrode plates are mounted on the outer case respectively.

Patent document 1 discloses a lithium ion secondary battery having a prismatic case. Through holes are formed in a lid of the case. A rod like barrel portion is inserted into each through hole, a first flange portion is connected to one end portion of the barrel portion in the inside of the case, and a terminal plate (external terminal) is connected to the other end portion of the barrel portion. The tabs of the electrode assembly are connected to the first flange portion.

PRIOR ART DOCUMENTS

Patent Documents

Patent Document 1: JP-A-2016-91659

SUMMARY OF THE INVENTION

Problems to be Solved by the Invention

Recently, there has been a demand for an energy storage device capable of performing a quick charge and a quick discharge. When a quick charge or a quick discharge is performed, a relatively large electric current flows in a current path. There has been a demand for a high-performance energy storage device which exhibits a small resistance loss in the current path even when a large electric current flows in the current path. There has been also a demand for an energy storage device where a current path is not shut down by fusing even when a large electric current flows in the current path.

The present invention has been made in view of such circumstances, and it is an object of the present invention to provide an energy storage device capable of sufficiently lowering a resistance of a current path.

Means for Solving the Problems

An energy storage device according to the present invention includes: an outer case having a lid plate on which an external terminal is mounted; a plate having a tab and housed in the outer case; a conductive shaft portion penetrating the lid plate and having one end thereof connected to the external terminal; and a conductive plate portion housed in the outer case, and having a first surface to which the other end of the conductive shaft portion is connected and a second surface to which the tab is connected, wherein a size of the conductive plate portion and a size of the tab are respectively set larger than a size of the external terminal in a planar direction of the lid plate.

Advantages of the Invention

In the present invention, the size of the conductive plate portion and the size of the tab are respectively larger than the size of the external terminal in the planar direction of the lid plate. Accordingly, compared to a case where the size of the conductive plate portion and the size of the tab are respectively set smaller than the size of the external terminal in the planar direction, a contact area between the tab and the conductive plate portion is increased so that a resistance of a current path can be reduced.

MODE FOR CARRYING OUT THE INVENTION

Figure 1:
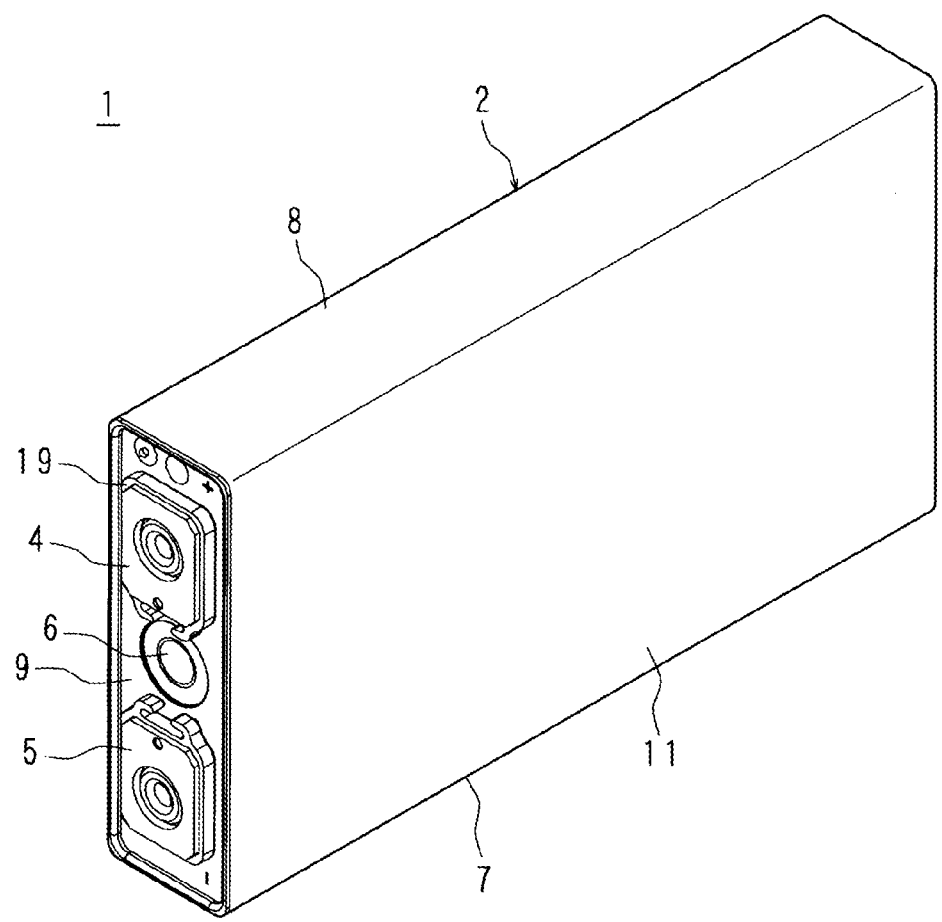
FIG. 1 is a schematic perspective view of an energy storage device.
Figure 2:
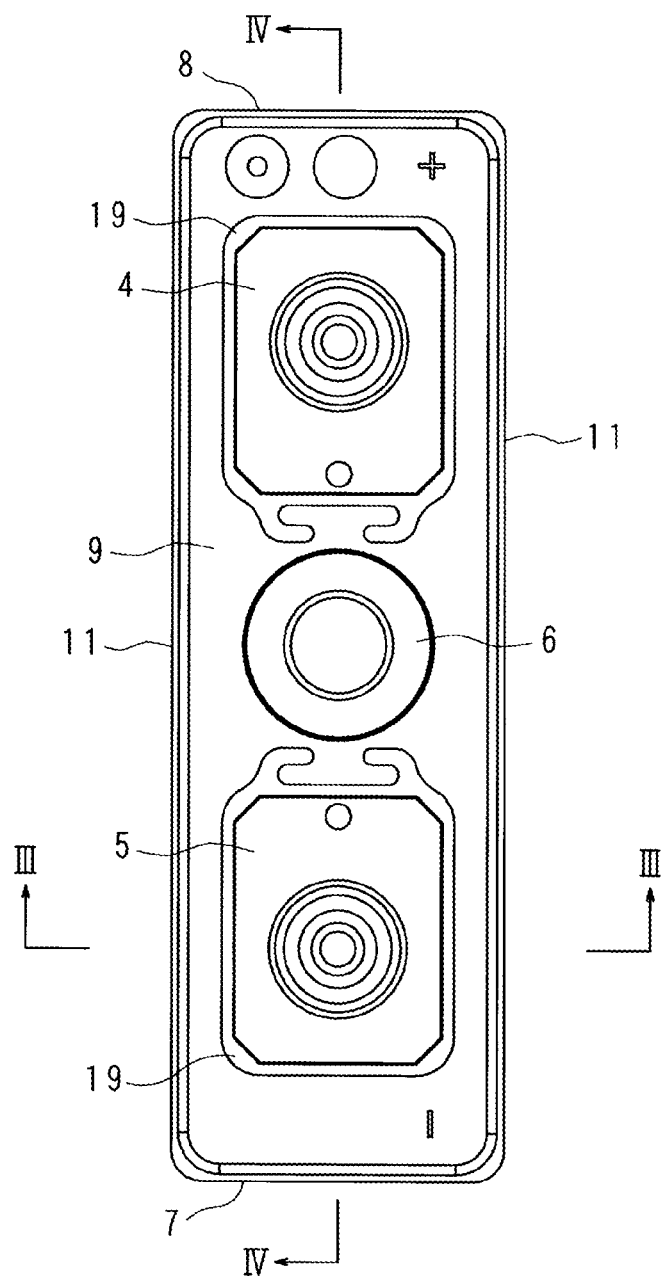
FIG. 2 is a schematic front view of the energy storage device.

Hereinafter, the present invention is described with reference to drawings which show an energy storage device according to an embodiment. FIG. 1 is a schematic perspective view of the energy storage device, and FIG. 2 is a schematic front view of the energy storage device. The energy storage device 1 may also be a lithium ion secondary battery.

The energy storage device 1 includes an outer case 2 having a rectangular parallelepiped shape. A stacked electrode assembly 3 described later is accommodated in the outer case 2 together with an electrolyte solution. In this embodiment, the outer case 2 is formed of a metal case. A material for forming the metal case may be aluminum, an aluminum alloy, or stainless steel, for example. The outer case 2 has: a rectangular-shaped bottom wall 7 and a rectangular-shaped ceiling wall 8 which are disposed opposite to each other and have substantially the same size; a rectangular-shaped lid plate 9 and a rectangular-shaped rear wall 10 which connect short sides of the bottom wall 7 and short sides of the ceiling wall 8 to each other respectively and have an area smaller than an area of the bottom wall 7 and the ceiling wall 8; and two rectangular-shaped side walls 11, 11 which connect long sides of the bottom wall 7 and long sides of the ceiling wall 8 to each other respectively and have an area larger than the area of the bottom wall 7 and the ceiling wall 8. In this embodiment, the lid plate 9 extends perpendicular to the bottom wall 7 mounted on a mounting surface (not shown in the drawing) of the energy storage device 1, and the lid plate 9 forms a part of the side surface of the energy storage device 1. Alternatively, the lid plate may be disposed at a position of the ceiling wall 8 on a side opposite to the bottom wall 7 of the energy storage device 1.

As shown in FIG. 2, a positive electrode external terminal 4 is mounted on one end portion of an outer surface of the lid plate 9 by way of an outer gasket 19, and a negative electrode external terminal 5 is mounted on the other end portion of the outer surface of the lid plate 9 by way of an outer gasket 19. The positive electrode external terminal 4 and the negative electrode external terminal 5 expose respective flat outer surfaces, and a conductive member such as a bus bar (not shown in the drawing) is welded to the positive electrode external terminal 4 and the negative electrode external terminal 5. A rupture valve 6 is formed on the lid plate 9 between the positive electrode external terminal 4 and the negative electrode external terminal 5.

Figure 3:
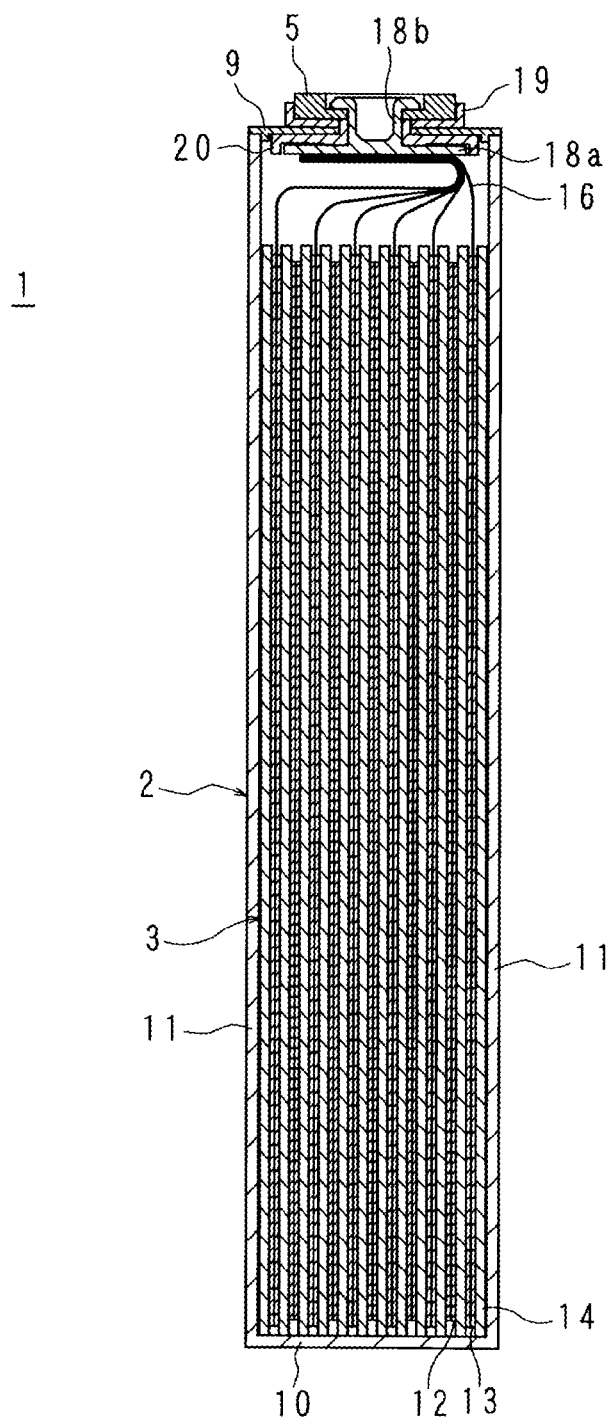
FIG. 3 is a schematic cross-sectional view of the energy storage device taken along line III-III in FIG. 2.

FIG. 3 is a schematic cross-sectional view of the energy storage device 1 taken along a line III-III in FIG. 2. As shown in FIG. 3, the stacked electrode assembly 3 includes a plurality of positive electrode plates 12, a plurality of negative electrode plates 13 and a plurality of separators 14. The positive electrode plate 12, the negative electrode plate 13 and the separator 14 respectively have a rectangular shape as viewed in a direction which penetrates side walls 11, 11 in FIG. 3. The plurality of positive electrode plates 12 and the plurality of negative electrode plates 13 are alternately stacked to each other with the separator 14 sandwiched between the positive electrode plate 12 and the negative electrode plate 13. In FIG. 3, negative electrode tabs 16 (described later) extending from the respective negative electrode plates 13 are bundled on a distal end side of these negative electrode tabs 16, and the negative electrode tabs 16 are joined to a conductive plate portion 18a. To increase energy density of the energy storage device 1 (to reduce a space occupied by a current path between the negative electrode external terminal 5 and the negative electrode plates 13), the negative electrode tabs 16 are housed in the inside of the outer case 2 in a bent state. Although not shown in the drawing, positive electrode tabs 15 (described later) extending from the positive electrode plates 12 also have substantially the same configuration as the negative electrode tabs 16.

The positive electrode plate 12 has: a foil-like or a sheet-like positive electrode substrate having conductivity; and a positive active material layer which is stacked on both surfaces of the positive electrode substrate. The negative electrode plate 13 has: a foil-like or a sheet-like negative electrode substrate having conductivity; and a negative active material layer stacked on both surfaces of the negative electrode substrate.

The separator 14 is made of a sheet-like or a film-like material which allows the infiltration of an electrolyte solution into the separator 14. As a material for forming the separator 14, a woven fabric, a non-woven fabric, or porous and sheet-like or film-like resin are named, for example. The separator 14 makes the positive electrode plate 12 and the negative electrode plate 13 separate from each other and, at the same time, retains an electrolyte solution between the positive electrode plate 12 and the negative electrode plate 13.

Figure 4:
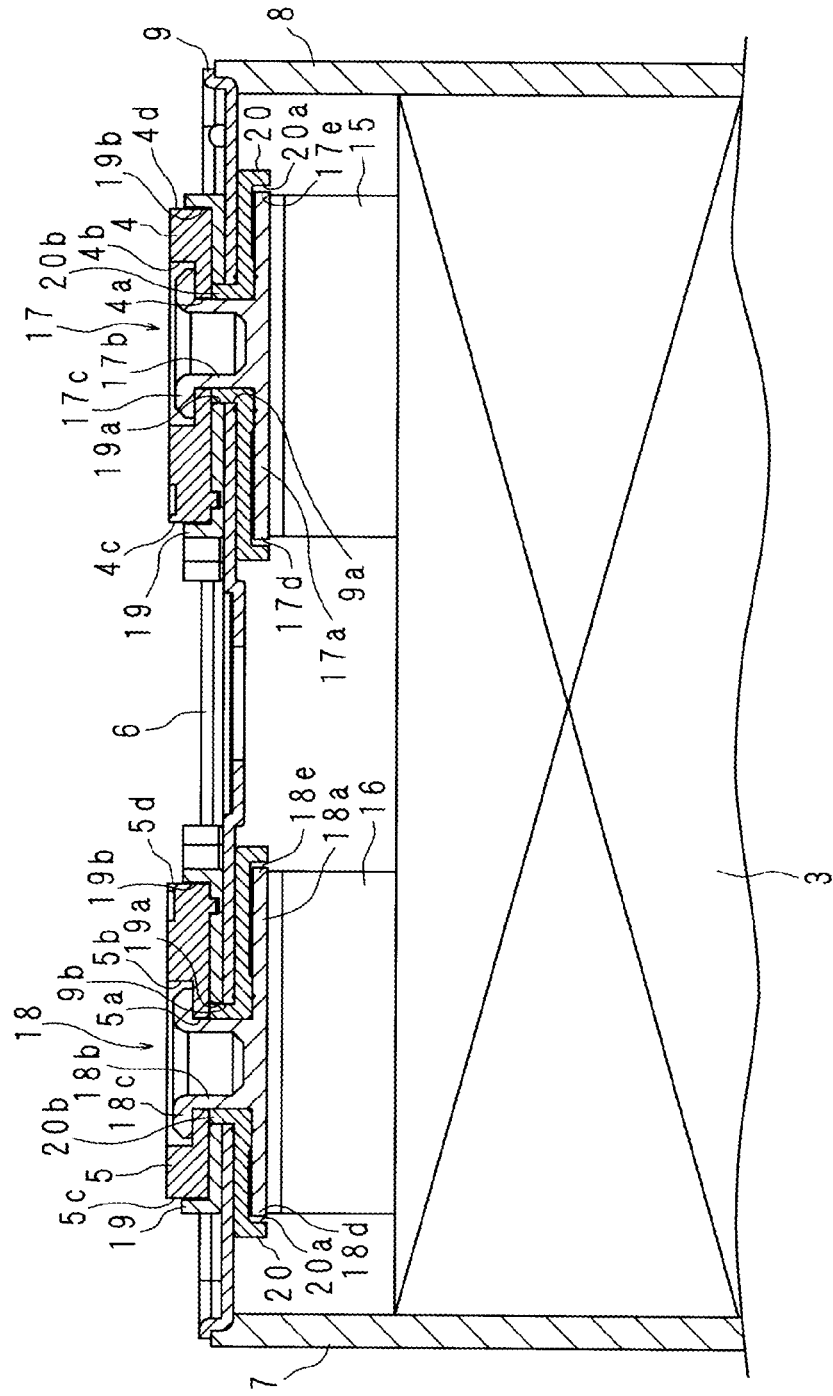
FIG. 4 is a partially enlarged cross-sectional view of a lid plate and an area in the vicinity of the lid plate taken along line IV-IV in FIG. 2.

FIG. 4 is a partially enlarged cross-sectional view of the lid plate 9 and an area in the vicinity of the lid plate 9 taken along line IV-IV in FIG. 2. Two through holes 9a, 9b are formed in the lid plate 9 in a paced apart manner from each other in a longitudinal direction of the lid plate 9. The rupture valve 6 is disposed between two through holes 9a, 9b. Alternatively, the rupture valve 6 may be disposed on the rear wall 10 (see FIG. 3) disposed opposite to the lid plate 9.

As shown in FIG. 4, an inner gasket 20 having electrically insulating property is disposed on an inner surface of the lid plate 9 at a position in the vicinity of the through hole 9a. The inner gasket 20 has a rectangular plate-shaped gasket body having long sides parallel to a longitudinal direction of the lid plate 9, and the gasket body extends along and in contact with an inner surface of the lid plate 9. A through hole is formed in the gasket body of the inner gasket 20, and a cylindrical boss 20b is formed on the gasket body so as to surround the through hole. On a surface of the gasket body of the inner gasket 20 which oppositely faces the stacked electrode assembly 3, a recessed portion 20a extending in a longitudinal direction of the lid plate 9 is formed. The inner gasket 20 has a ring-shaped protruding portion to be compressed on both surfaces of the gasket body on an outer peripheral side of the boss 20b respectively. The protruding portion to be compressed is not limited to a ring shape, and a plurality of protruding portions to be compressed may be formed in a spaced apart manner in a peripheral direction of the inner gasket 20. The protruding portion to be compressed may be formed only one-side surface (outer surface or inner surface) of the gasket body. Gas tightness of the outer case 2 can be ensured by collapsing the protruding portion to be compressed by pressing.

An outer gasket 19 having electrically insulating property is disposed in the vicinity of the through hole 9a on the outer surface of the lid plate 9. The outer gasket 19 has substantially the same rectangular-plate shape as the inner gasket 20, and a through hole 19a is formed in a center portion of the outer gasket 19. A diameter of the through hole 19a is larger than an outer diameter of the boss 20b of the inner gasket 20. A recessed portion 19b is formed on one surface of the outer gasket 19. The other surface of the outer gasket 19 oppositely faces the outer surface of the lid plate 9. The boss portion 20b of the inner gasket 20 is inserted into the through hole 9a formed in the lid plate 9 and the through hole 19a formed in the outer gasket 19. A distal end surface of the boss 20b is approximately coplanar with a bottom surface of the recessed portion 19b of the outer gasket 19.

The positive electrode external terminal 4 has a plate shape, and a through hole 4a is formed in the positive electrode external terminal 4 in the vicinity of a center of the positive electrode external terminal 4. A diameter of the through hole 4a is approximately equal to an inner diameter of the boss 20b. A counter bore 4b is formed in one surface of the positive electrode external terminal 4 around the through hole 4a. The positive electrode external terminal 4 is disposed in the inside of the recessed portion 19b such that the other surface of the positive electrode external terminal 4 and a bottom surface of the recessed portion 19b of the outer gasket 19 oppositely face each other. The through hole 4a and the boss 20b are coaxially disposed, and the counter bore 4b is exposed to the outside.

The positive electrode external terminal 4 and the outer gasket 19 are disposed on the outer surface of the lid plate 9 and the inner gasket 20 and the positive electrode current collector 17 are disposed on the inner surface of the lid plate 9. At the time of welding a bus bar or the like to the positive electrode external terminal 4, heat generated by welding is liable to be easily transferred to the outer gasket 19. The protruding portion to be compressed which is provided for ensuring gas tightness of the outer case 2 is disposed on the inner gasket 20 as described previously and hence, heat is minimally transferred to the protruding portion to be compressed whereby gas tightness of the outer case 2 by the protruding portion to be compressed can be maintained.

The positive electrode current collector 17 is mounted on the positive electrode external terminal 4. The positive electrode current collector 17 includes: a rectangular-shaped positive electrode conductive plate portion 17*a* having long sides parallel to the longitudinal direction of the lid plate 9; and a cylindrical positive electrode conductive shaft portion 17*b* protruding from one surface of the positive electrode conductive plate portion 17*a*. An outer diameter of the positive electrode conductive shaft portion 17*b* is set smaller than a diameter of the through hole 4*a* of the positive electrode external terminal 4 and an inner diameter of the boss 20*b* of the inner gasket 20. In this embodiment, although the positive electrode conductive shaft portion 17*b* is hollow (hollow rivet), the positive electrode conductive shaft portion may be solid (solid rivet) as an alternative case. The other surface of the positive electrode conductive plate portion 17*a* is formed flat. Although it is preferable that the other surface of the positive electrode conductive plate portion 17*a* be a flat surface, the presence of a recess is allowed to some extent provided that joining property of the tabs is not lost. The positive electrode conductive plate portion 17*a* and the positive electrode conductive shaft portion 17*b* are integrally formed with each other. In this embodiment, the positive electrode conductive plate portion 17*a* and the positive electrode conductive shaft portion 17*b* are formed as an integral part made of the same material.

A size of the positive electrode conductive plate portion 17*a* is larger than a size of the positive electrode external terminal 4 in the longitudinal direction of the lid plate 9, that is, in a planar direction of the lid plate 9. As shown in FIG. 4, as viewed in cross section, one end 17*d* and the other end 17*e* of the positive electrode conductive plate portion 17*a* respectively protrude from one side end 4*c* and the other side end 4*d* of the positive electrode external terminal 4 in the planar direction of the lid plate 9.

The positive electrode conductive shaft portion 17*b* is inserted into the boss 20*b* from the recessed portion 20*a* of the inner gasket 20, and a distal end portion 17*c* of the positive electrode conductive shaft portion 17*b* is disposed outside the through hole 4*a* of the positive electrode external terminal 4 and is swaged (expanded by pressing). The swaged distal end portion 17*c* is disposed in the inside of the counter bore 4*b*. The positive electrode conductive plate portion 17*a* is disposed in the inside of the recessed portion 20*a*. By swaging the distal end portion 17*c*, the positive electrode external terminal 4, the outer gasket 19, the lid plate 9, and the inner gasket 20 are clamped between the distal end portion 17*c* and the positive electrode conductive plate portion 17*a*.

As shown in FIG. 4, the plurality of positive electrode plates 12 respectively have the strip-shaped positive electrode tab 15. A size of the positive electrode tab 15 is larger than a size of the positive electrode external terminal 4 in the longitudinal direction of the lid plate 9, that is, in the planar direction of the lid plate 9. The positive electrode tab 15 is connected to the other surface of the positive electrode conductive plate portion 17*a*, that is, a surface of the positive electrode conductive plate portion 17*a* on a side opposite to a surface of the positive electrode conductive plate portion 17*a* from which the positive electrode conductive shaft portion 17*b* protrudes by ultrasonic welding, laser welding, or swaging, for example. The positive electrode tab 15 is connected to the positive electrode conductive plate portion 17*a* ranging from a portion of the positive electrode conductive plate portion 17*a* protruding from one side end 4*c* of the positive electrode external terminal 4 to a portion of the positive electrode conductive plate portion 17*a* protruding from the other side end 4*d* of the positive electrode external terminal 4. The positive electrode tab 15 is connected to at least a portion of the other surface of the positive electrode conductive plate portion 17*a* which is opposite to the positive electrode conductive shaft portion 17*b*.

In the vicinity of the through hole 9*b* of the lid plate 9, the inner gasket 20, the outer gasket 19, the negative electrode external terminal 5, and the negative electrode current collector 18 are disposed. These inner gasket 20, the outer gasket 19, the negative electrode external terminal 5, and the negative electrode current collector 18 have substantially the same configurations as the previously-mentioned the inner gasket 20, the outer gasket 19, the positive electrode external terminal 4, and the positive electrode current collector 17 disposed in the vicinity of the through hole 9*a* and hence, the detailed description of these parts is omitted when appropriate.

The negative electrode external terminal 5 includes a through hole 5*a* and a counter bore 5*b*. The negative electrode current collector 18 includes: a negative electrode conductive plate portion 18*a*; and a negative electrode conductive shaft portion 18*b* protruding from one surface of the negative electrode conductive plate portion 18*a*. A distal end portion 18*c* of the negative electrode conductive shaft portion 18*b* is swaged. A size of the negative electrode conductive plate portion 18*a* is larger than a size of the negative electrode external terminal 5 in the longitudinal direction of the lid plate 9, that is, in the planar direction of the lid plate 9.

The plurality of negative electrode plates 13 respectively have the strip-shaped negative electrode tab 16. A size of the negative electrode tab 16 is larger than a size of the negative electrode external terminal 5 in the longitudinal direction of the lid plate 9, that is, in the planar direction of the lid plate 9. One end 18*d* and the other end 18*e* of the negative electrode conductive plate portion 18*a* respectively protrude from one side end 5*c* and the other side end 5*d* of the negative electrode external terminal 5 in the planar direction of the lid plate 9. The negative electrode tab 16 is connected to the other surface of the negative electrode conductive plate portion 18*a* ranging from a portion of the negative electrode conductive plate portion 18*a* protruding from one side end 5*c* of the negative electrode external terminal 5 to a portion of the negative electrode conductive plate portion 18*a* protruding from the other side end 5*d* of the negative electrode external terminal 5 by ultrasonic welding, laser welding, or swaging, for example.

In the above-mentioned energy storage device 1, the stacked electrode assembly formed by stacking the plurality of positive electrode plates 12 and the plurality of negative electrode plates 13 is used. However, alternatively, a winding electrode assembly formed by winding one positive electrode plate and one negative electrode plate with a separator interposed therebetween may be used. Although the positive electrode external terminal 4 and the negative electrode external terminal 5 are arranged on the lid plate 9, the positive electrode external terminal 4 and the negative electrode external terminal 5 may be disposed on two surfaces of the outer case 2 respectively.

In the above-mentioned energy storage device 1, respective sizes of the conductive plate portions 17a, 18a and tabs 15, 16 are larger than sizes of the external terminals 4, 5 in the planar direction of the lid plate 9. Compared to a case where the respective sizes of the conductive plate portions 17a, 18a and tabs 15, 16 are smaller than the sizes of the external terminals 4, 5 in the planar direction of the lid plate 9, contact areas between the tabs 15, 16 and the conductive plate portions 17a, 18a can be increased so that resistances of current paths can be reduced. Since width sizes of the tabs 15, 16 are large, even when a large electric current flows in the tabs 15, 16, the tabs 15, 16 are minimally shut down by fusing.

The tabs 15, 16 are connected to at least portions of the conductive plate portions 17a, 18a which are disposed opposite to the conductive shaft portions 17b, 18b. Accordingly, current paths from the tabs 15, 16 to the external terminals 4, 5 become the shortest and hence, resistance values of the current paths can be lowered.

One ends 17d, 18d and the other ends 17e, 18e of the conductive plate portions 17a, 18a protrude from one side ends 4c, 5c and the other side ends 4d, 5d of the external terminals 4, 5 respectively in the planar direction of the lid plate 9, and the tabs 15, 16 are connected to the conductive plate portions 17a, 18a ranging from portions of the conductive plate portions 17a, 18a protruding from one side ends 4c, 5c of the external terminals 4, 5 to portions of the conductive plate portions 17a, 18a protruding from the other side ends 4d, 5d of the external terminals 4, 5. Accordingly, sufficiently large contact areas can be ensured between the tabs 15, 16 and the conductive plate portions 17a, 18a and hence, resistance values of current paths can be lowered.

The conductive plate portion 17a and the conductive shaft portion 17b are integrally formed with each other, and the conductive plate portion 18a and the conductive shaft portion 18b are integrally formed with each other. Accordingly, compared to a case where the conductive plate portion 17a and the conductive shaft portion 17b are formed as separate parts and the conductive plate portion 18a and the conductive shaft portion 18b are formed as separate parts, the resistance values of the current paths can be lowered, and strengths of the current collectors 17, 18 can be increased.

One ends of the conductive shaft portions 17b, 18b are inserted into the through holes 4a, 5a of the external terminals 4, 5 and are swaged to the external terminals 4, 5. For example, the conductive shaft portions 17b, 18b can be mounted on the external terminals 4, 5 simply in a short time by spin swaging. By disposing the swaged portions outside the lid plate 9, the swaged portions do not exist inside the lid plate 9. Accordingly, surfaces of the conductive plate portions 17a, 18a which opposedly face the stacked electrode assembly 3 can be formed into flat surfaces having no unevenness and hence, the tabs 15, 16 can be joined to the flat surfaces easily and with certainty.

Figure 5:
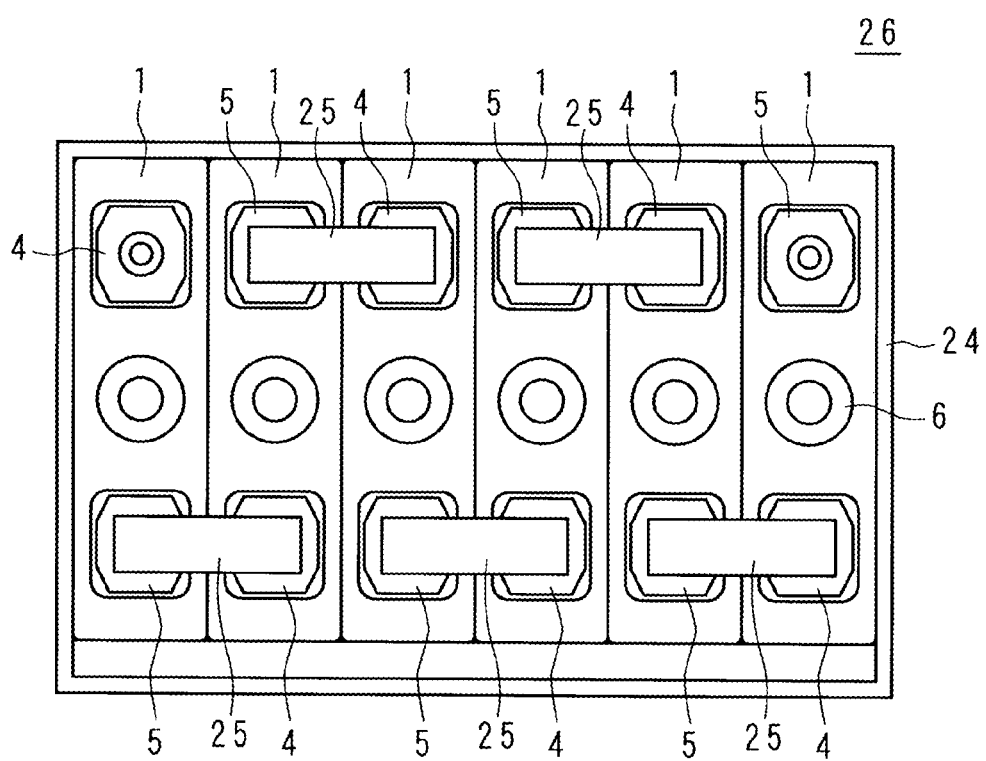
FIG. 5 is a schematic view of an energy storage module having a plurality of energy storage devices.

An energy storage module can be manufactured by using a plurality of energy storage devices 1. FIG. 5 is a schematic view of an energy storage module 26 having the plurality of energy storage devices 1. The energy storage module 26 includes: a holder 24 formed of a box, end plates and the like; and the plurality of energy storage devices 1 held by the holder 24. The plurality of energy storage devices 1 are arranged such that walls (lid plates) on which the external terminals are disposed are directed in the same direction. In this embodiment, the lid plates of the plurality of energy storage devices 1 are raised from a mounting surface, and the external terminals mounted on these lid plates are directed toward a side of the energy storage module. With respect to the plurality of energy storage devices 1, the energy storage devices disposed adjacently to each other are arranged such that a vertical arrangement relationship between the positive electrode external terminal 4 and the negative electrode external terminal 5 is reversed. By connecting the positive electrode external terminal 4 of the energy storage device 1 and the negative electrode external terminal 5 of the energy storage device 1 disposed adjacently to the former energy storage device 1 by the bus bar 25, the plurality of energy storage devices 1 can be connected in series. The plurality of energy storage devices 1 may be connected to each other in parallel by connecting the same electrodes.

The conductive plate portions 17a, 18a of the energy storage device 1 are disposed just below the conductive shaft portions 17b, 18b. Accordingly, compared to a case where the conductive plate portions 17a, 18a are not disposed just below the conductive shaft portions 17b, 18b, sizes of the current collectors 17, 18 in the longitudinal direction of the lid plate 9 can be reduced. Accordingly, a height size of the energy storage module 26 can be also reduced and hence, the present invention is applicable to a case where an energy storage module is arranged in a space having a limited height.

The embodiment disclosed in this specification is provided for an exemplifying purpose in all aspects and is not limitative. The technical features described in the embodiment can be combined with each other, and the scope of the present invention is intended to include all modifications which fall within Claims and scopes equivalent to Claims.

The sizes of the tabs 15, 16 may be set equal to or slightly smaller than the sizes of the external terminals 4, 5 provided that resistances of current paths can be sufficiently suppressed. By joining the tabs 15, 16 to portions of the conductive plate portions 17a, 18a which are disposed opposite to the conductive shaft portions 17b, 18b and portions disposed on both sides of such portions on the surfaces of the conductive plate portions 17a, 18a which opposedly face the stacked electrode assembly 3, contact areas between the tabs 15, 16 and the conductive plate portions 17a, 18a can be ensured.

Although the description has been made with respect to the case where the energy storage device 1 is the lithium ion secondary battery, the energy storage device 1 is not limited to a lithium ion secondary battery. The energy storage device 1 may be one of other secondary batteries such as a nickel hydrogen battery. Further, the energy storage device 1 may be a primary battery or an electrochemical cell such as a capacitor.

DESCRIPTION OF REFERENCE SIGNS

1: energy storage device
2: outer case
4: positive electrode external terminal
5: negative electrode external terminal
9: lid plate
12: positive electrode plate
13: negative electrode plate
17: positive electrode current collector
17a: positive electrode conductive plate portion
17b: positive electrode conductive shaft portion

18: negative electrode current collector
18a: negative electrode conductive plate portion
18b: negative electrode conductive shaft portion
26: energy storage module

The invention claimed is:

1. An energy storage device comprising:
   an outer case including a lid plate on which an external terminal is mounted;
   a plate including a tab and housed in the outer case;
   a conductive shaft portion penetrating the lid plate and including one end thereof connected to the external terminal; and
   a conductive plate portion housed in the outer case, and including a first surface to which an other end of the conductive shaft portion is connected and a second surface to which the tab is connected,
   wherein a size of the conductive plate portion is set larger than a size of the external terminal in a planar direction of the lid plate,
   wherein the external terminal includes a counter bore in an outer surface of the external terminal, and
   wherein one end of the conductive shaft portion is swaged, disposed in an inside of the counter bore, and is in a same level as the outer surface of the external terminal or is placed closer to the lid plate than the outer surface of the external terminal in a direction in which the conductive shaft portion extends.

2. The energy storage device according to claim 1, wherein the tab is connected to at least a portion of the conductive plate portion which is disposed opposite to the conductive shaft portion.

3. The energy storage device according to claim 1, wherein the conductive plate portion includes a rectangular shape including long sides parallel to a longitudinal direction of the lid plate, and
   wherein the tab is directly connected to the second surface of the conductive plate portion.

4. The energy storage device according to claim 1, further comprising an electrical insulating member disposed between the lid plate and the conductive plate portion in a direction in which the conductive shaft portion extends, and
   wherein a part of the electrical insulating member is disposed between the conductive plate portion and a side surface of the outer case in the planar direction of the lid plate.

5. The energy storage device according to claim 1, further comprising an electrical insulating member disposed between the lid plate and the conductive plate portion in a direction in which the conductive shaft portion extends, and
   wherein a part of the electrical insulating member covers a portion in the planar direction of the lid plate, the portion being where the tab and the conductive plate portion are joined.

6. The energy storage device according to claim 1, wherein the planar direction of the lid plate is a longitudinal direction of the lid plate.

7. The energy storage device according to claim 1, wherein the planar direction of the lid plate is a short-side direction of the lid plate.

8. The energy storage device according to claim 1, wherein the tab is connected to the conductive plate portion ranging from one end of the tab in the planar direction of the lid plate and another end of the tab in the planar direction of the lid plate.

9. The energy storage device according to claim 1, wherein a portion which the tab faces the conductive plate portion in the planar direction of the lid plate is connected to the conductive plate portion so as not to protrude from the conductive plate portion in the planar direction of the lid plate.

10. The energy storage device according to claim 1, wherein the tab is integrally formed with the plate,
    wherein the tab is disposed apart from a side surface of the outer case in the planar direction of the lid plate, and
    wherein the tab protrudes from an end edge of the plate toward the lid plate.

11. An energy storage device comprising:
    an outer case including a lid plate on which an external terminal is mounted;
    a plate including a tab and housed in the outer case;
    a conductive shaft portion penetrating the lid plate and including one end thereof connected to the external terminal; and
    a conductive plate portion housed in the outer case, and including a first surface to which an other end of the conductive shaft portion is connected and a second surface to which the tab is connected,
    wherein a size of the tab is set larger than a size of the external terminal in a planar direction of the lid plate,
    wherein the external terminal includes a counter bore in an outer surface of the external terminal, and
    wherein one end of the conductive shaft portion is swaged, disposed in an inside of the counter bore, and is in a same level as the outer surface of the external terminal or is placed closer to the lid plate than the outer surface of the external terminal in a direction in which the conductive shaft portion extends.

12. The energy storage device according to claim 11, wherein the tab is integrally formed with the plate,
    wherein the tab is disposed apart from a side surface of the outer case in the planar direction of the lid plate, and
    wherein the tab protrudes from an end edge of the plate toward the lid plate.

13. The energy storage device according to claim 11, wherein the plate includes a positive electrode plate and a negative electrode plate, and
    wherein the tab includes a positive electrode tab extending from an end edge of the positive electrode plate toward the lid plate and a negative electrode tab extending from an end edge of the negative electrode plate toward the lid plate.

14. The energy storage device according to claim 11, further comprising an electrical insulating member disposed between the lid plate and the conductive plate portion in a direction in which the conductive shaft portion extends, and
    wherein the size of the tab in the planar direction of the lid plate is set smaller than a size of the electrical insulating member in the planar direction of the lid plate.

15. The energy storage device according to claim 11, wherein the tab is connected to the conductive plate portion ranging from one end of the tab in the planar direction of the lid plate and another end of the tab in the planar direction of the lid plate.

16. The energy storage device according to claim 11, wherein a portion which the tab faces the conductive plate portion in the planar direction of the lid plate is connected to the conductive plate portion so as not to protrude from the conductive plate portion in the planar direction of the lid plate.

17. The energy storage device according to claim 11, wherein the planar direction of the lid plate is a longitudinal direction of the lid plate.

18. The energy storage device according to claim 11, wherein the planar direction of the lid plate is a short-side direction of the lid plate.

19. The energy storage device according to claim 11, wherein the one end of the conductive shaft portion is placed closer to the lid plate than the outer surface of the external terminal in the direction in which the conductive shaft portion extends.

20. An energy storage device comprising:
an outer case including a lid plate on which an external terminal is mounted;
a plate including a tab and housed in the outer case;
a conductive shaft portion penetrating the lid plate and including one end thereof connected to the external terminal; and
a conductive plate portion housed in the outer case, and including a first surface to which an other end of the conductive shaft portion is connected and a second surface to which the tab is connected,
wherein a size of the tab is set larger than a size of the external terminal in a planar direction of the lid plate,
wherein the tab is integrally formed with the plate,
wherein the tab is disposed apart from a side surface of the outer case in the planar direction of the lid plate, and
wherein the tab protrudes from an end edge of the plate toward the lid plate.

21. An energy storage device comprising:
an outer case including a lid plate on which an external terminal is mounted;
a plate including a tab and housed in the outer case;
a conductive shaft portion penetrating the lid plate and including one end thereof connected to the external terminal; and
a conductive plate portion housed in the outer case, and including a first surface to which an other end of the conductive shaft portion is connected and a second surface to which the tab is connected,
wherein a size of the conductive plate portion is set larger than a size of the external terminal in a planar direction of the lid plate,
wherein the tab is integrally formed with the plate,
wherein the tab is disposed apart from a side surface of the outer case in the planar direction of the lid plate, and
wherein the tab protrudes from an end edge of the plate toward the lid plate.

* * * * *